3,070,633
PROCESS FOR PRODUCING 1,6-HEXANEDIOL
Torleif Utne, Warrenville, Robert E. Jones, Rahway, and John D. Garber, Westfield, N.J., assignors to Merck & Co., Inc., Rahway, N.J., a corporation of New Jersey
No Drawing. Filed Sept. 10, 1958, Ser. No. 760,059
6 Claims. (Cl. 260—635)

This invention has for its object the provision of an improved process for the production of the compound 1,6-hexanediol. In accordance with the process of the invention, 2,5-tetrahydrofurandimethanol (for convenience called THF-glycol) is subjected to catalytic hydrogenolysis giving the 1,6-hexanediol in good yield:

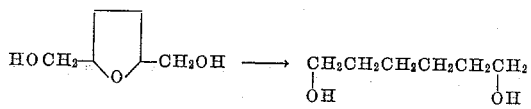

The compound 1,6-hexanediol is a very important compound especially for use as an intermediate, for example, for conversion to hexamethylenediamine, an important intermediate in forming nylon. The compound may also be used to form polyesters, polyurethanes, as a plasticizer, and for gasoline extractions.

During the course of an extensive investigation we have discovered a process employing a combination of temperature and catalyst for the efficient hydrogenolysis of THF-glycol under a suitable hydrogen pressure for the production of 1,6-hexanediol. The catalyst found to be most effective is copperchromite (CuCrO) with or without barium oxide (BaO). It has been found that there are optimum pressures and amounts of catalysts that should be used but these are not critical. However, the yield is materially influenced by temperature which must be kept within a fairly close range. The process may be carried out without any solvent or with the THF-glycol in a suitable organic solvent. The solution method gives some manipulative advantages but no significant differences in the results, whereas a continuous process using for instance a fixed bed catalyst is more easily adapted if no solvent is used.

The invention is commercially important because of the availability of inexpensive initial and intermediate materials used in the process. For example, the 5-hydroxy-methyl furfural from sugar may be subjected to hydrogenation to form the THF-glycol, as mentioned in the copending patent application of ourselves, Ser. No. 760,056 filed herewith, entitled Hydrogenation of 5-Hydroxy-Methyl Furfural.

In the course of our investigations we have found that, of the reaction conditions, the most important variable which influences the reaction is temperature as it can affect both the kinds of compounds formed and their yields. Besides 1,6-hexanediol and unchanged THF-glycol, 1,2,6-hexanetriol is also formed, both of which can be recycled. In carrying out the process with the THF-glycol dissolved in an organic solvent, we may use such solvents as methanol, ethanol, cyclohexane or dimethoxymethane. The reaction goes very well without a solvent at 300° C. giving yields of from 39 to 49%; with the yields decreasing as the temperature decreases. In the presence of dimethoxyethane as a solvent, yields of 27 to 34% were attained at 275° C., but substantially none at 300° C. Also, cyclohxane at 275° C. gives a yield at 29 to 36%, whereas methanol gives no detectable yield at 275° C., but from 40 to 50% at 300° C., declining to 12–15% at 325° C.

The hydrogen pressure does not appear to be a critical factor although there is some relation between pressure and temperature for optimum results. Pressures varying from 1,000 to 20,000 p.s.i. may be used but better results are obtained with pressures of 2,000 to 6,500 p.s.i., the principal differences at different pressures being in the percentages of the compound produced. For example, at 2,000 p.s.i. the yield was 25 to 32% compared with a yield of 40 to 50% at 5,000 p.s.i., and otherwise under identical conditions (300° C. for 11 hours). The highest yields have been achieved by carrying out the process for about 8–11 hours, but shorter time can be used if the temperature is adjusted correspondingly. In other words, the temperature and other conditions such as contact time can be varied by anyone versed in the art, and the temperature-time relationship given in the examples represent only one point on a curve. Thus by employing shorter contact times such as obtained in a continuous fixed bed reactor, acceptable yields of 1,6-hexanediol are obtainable at 325° C. or higher in all the systems studied. When water was employed as a solvent no significant yield of diol was formed at 325° C. under standard conditions. Here again higher temperatures may be used to effect hydrogenolysis.

The following examples illustrate operations carried out in accordance with the process of the invention. In several of the examples the yields were determined from the weights of the bis-3,5-dinitrobenzoate formed from an aliquot of the crude, oily reaction products. The yield figures quoted correspond to the actual isolated amount as the lower limit, whereas the highest figure includes the yield of the benzoylation reaction itself (80%, or less), and, therefore, more correctly indicates the amount of 1,6-hexanediol present in the reaction mixture. The identity of this derivative was determind by mixed melting points, C—H—N— analysis, and comparison of IR-, NMR- and X-ray diffraction spectra with an authentic sample.

*Example I*

Twnty-six and four tenths grams of THF-glycol was dissolved in 150 cc. of methanol, and hydrogenated under 5500 lbs. pressure with 5 grams of copperchromite as the catalyst, for 11 hours at 300° C. After cooling, the catalyst was filtered off, the filtrate concentrated under vacuum (20 mm.), and the residual solvent removed by pumping (1 mm.). The oily residue was clarified by filtration through sintered glass.

Yield: 23.5 grams of brown oil: $n_D^{25} = 1.4558$.

An aliquot of this crude oil was reacted with 3,5-dinitrobenzoyl chloride, giving the bis-3,5-dinitrobenzoate of 1,6-hexanediol in an isolated and recrystallized yield of 40.6% or 50.0% if corrected for the yield of the benzoylation reaction.

Identification was by M.P., 169–71° C., after 2 recrystallizations from dioxane and ethanol; no depression of mixed melting point with authentic sample; identical IR-, MNR-, and X-ray diffraction spectra.

Calc. $C_{20}H_{18}N_4O_{12}$: 11.08% N; 47.50% C; 3.5% H. Found 11.25% N; 47.20% C; 3.52% H.

*Example II*

A run similar to Example I, except that the pressure was 6500 lbs., was distilled under vacuum (0.6 mm.). Several fractions gave bis-3,5-dinitrobenzoates of 1,6-hexanediol in various amounts.

One of these fractions, boiling range 104–105° C. at 0.6 mm., was 13.0 grams of a heavy, colorless oil: $n_D^{25} = 1.4579$, which by prolonged refrigeration gave beautiful crystals, M.P. 39–41° C., and identical IR with authentic 1,6-hexanediol.

Calc. $C_6H_{14}O_2$: 61.02% C; 11.95% H. Found: 61.04% C; 11.97% H.

*Example III*

This example was conducted in the same manner as

Example I, except that the temperature was raised to 325° C. The yield of 1,6-hexanediol, isolated as its bis-3,5-dinitrobenzoate, was 12–15%.

*Example IV*

This example was similar to Example I, except that the temperature was 275° C., and dimethoxyethane was used as the solvent. The yield of 1,6-hexanediol was 27–34%, isolated as in Example I.

*Example V*

This example was similar to Example IV, except that the reaction time was 8 hours, and cyclohexane was used as the reaction medium. The yield of 1,6-hexane was 29–36%.

*Example VI*

This example was similar to Example I, except that the pressure was 2000 lbs. The yield of 1,6-hexanediol was 25–32%.

*Example VII*

Twenty-six and four tenths grams of THF-glycol, with no solvent added, was hydrogenated under 4800 lbs. hydrogen pressure with 5 grams of copperchromite catalyst, for 10 hours at 300° C. The catalyst was filtered off, and the filtrate was pumped free of low-boiling components (1 mm.). The yield was 22.0 grams of colorless oil: $n_D^{25}=1.4520$. As in Example I, the 1,6-hexanediol was isolated as its bis-3,5-dinitro-benzoate. The yield was 39–49%.

*Example VIII*

This example was the same as in Example VII, except that the temperature was 280° C., pressure 5500 lbs., and time 11 hours. The yield of 1,6-hexanediol was 15–18%.

*Example IX*

This example was the same as in Example I, except that 26.0 grams of copperchromite catalyst was used (~100% of THF-glycol). The yield of 1,6-hexanediol was 13–16%. This illustrates the need for milder conditions, e.g. shorter contact time or lower temperature, when a fixed bed, continuous reactor is used.

We claim:

1. The process for producing 1,6-hexanediol which comprises subjecting 2,5-tetrahydrofurandimethanol to hydrogenolysis with hydrogen under a pressure of at least 1,000 p.s.i. and in the presence of a catalyst at a temperature of from 200° to 350° C.

2. The process according to claim 1 wherein the hydrogen pressure is between 1,000 and 20,000 lbs. per sq. inch.

3. The process according to claim 1 wherein the hydrogen pressure is between 2,000 and 6,500 lbs. per sq. inch.

4. The process for producing 1,6-hexanediol which comprises subjecting 2,5-tetrahydrofurandimethanol to hydrogenolysis while in solution in an organic solvent with hydrogen under a pressure of from 1,000 to 20,000 p.s.i. and in the presence of a copperchromite catalyst at a temperature of from 200° to 350° C.

5. The process according to claim 4 wherein the solvent is selected from the group consisting of methanol, ethanol, cyclohexane and dimethoxyethane.

6. The process according to claim 4 wherein the hydrogen pressure is from 2,000 to 6,500 lbs. per sq. inch.

References Cited in the file of this patent

UNITED STATES PATENTS 2,768,978    Robertson _____ Oct. 30, 1956

OTHER REFERENCES

Adkins: Org. Syntheses, vol. 26, pp. 83–85 (1946).
Dunlop et al.: The Furans, pp. 693–8 (1953).

UNITED STATES PATENT OFFICE
CERTIFICATE OF CORRECTION

Patent No. 3,070,633                        December 25, 1962

Torleif Utne et al.

It is hereby certified that error appears in the above numbered patent requiring correction and that the said Letters Patent should read as corrected below.

Column 2, line 55, for "3.5% H." read -- 3.58% H. --; column 3, line 13, for "1,6 hexane" read -- 1,6-hexanediol --; column 4, line 10, after "a", first occurrence, insert -- copperchromite --.

Signed and sealed this 27th day of August 1963.

(SEAL)
Attest:

ERNEST W. SWIDER
Attesting Officer

DAVID L. LADD
Commissioner of Patents